No. 826,204. PATENTED JULY 17, 1906.
S. G. WHITEHOUSE.
WHEELED VEHICLE.
APPLICATION FILED NOV. 1, 1904.
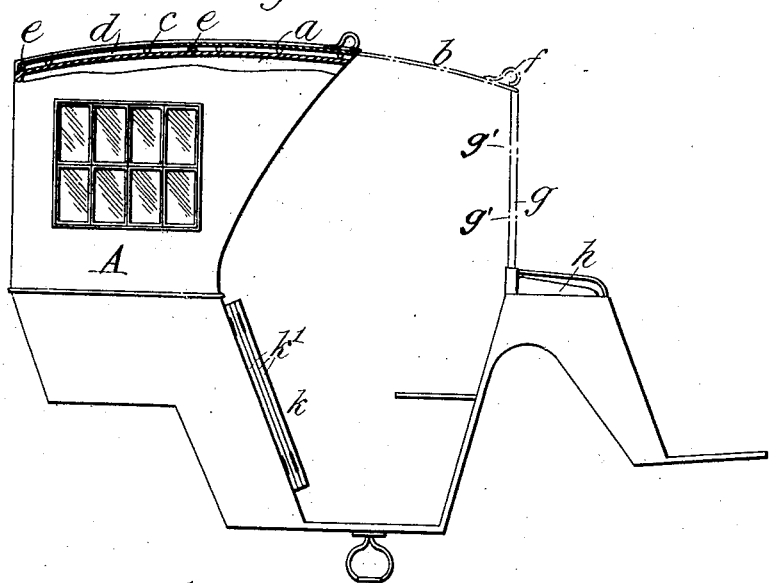
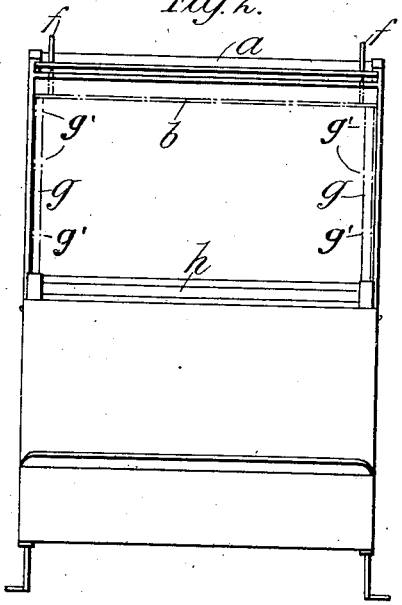
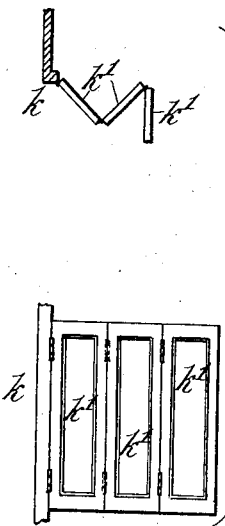
WITNESSES
E. A. Allen.
J. M. Laing.
INVENTOR
SAMUEL GROVES WHITEHOUSE
BY Edward S. Beach
ATTY.

UNITED STATES PATENT OFFICE.

SAMUEL GROVES WHITEHOUSE, OF MAIDA VALE, LONDON, ENGLAND.

WHEELED VEHICLE.

No. 826,204.　　　　　Specification of Letters Patent.　　　　Patented July 17, 1906.

Application filed November 1, 1904. Serial No. 231,024.

*To all whom it may concern:*

Be it known that I, SAMUEL GROVES WHITEHOUSE, cab proprietor, a subject of the King of Great Britain, residing at 5 Lanark Mews, Maida Vale, in the county of London, England, have invented certain new and useful Improvements Relating to Wheeled Vehicles, of which the following is a specification.

This invention relates to wheeled vehicles, and more particularly, though not exclusively, to four-wheeled cabs or carriages of the kind known as "victorias," having a rear portion somewhat resembling the body of a "hansom-cab" and a forward portion accommodating the driver and in some cases having a third seat for a passenger to sit "back to the horse." Hitherto cabs or carriages of this class have had little space for carrying luggage, and, moreover, the third party has had very poor shelter in wet weather.

The objects of this invention are for enabling such vehicles to carry more luggage when required and afford better roof protection for the vehicle than has heretofore been the case.

A further object of the invention is to provide suitable doors in the said vehicle, which will cause less inconvenience than hitherto has been possible to the said third party on the front seat of the vehicle when said doors are opened or closed.

In order that the said invention may be clearly understood, I will describe the same in connection with the accompanying drawings, in which—

Figure 1 is a side elevation, and Fig. 2 is a front elevation, of a vehicle constructed in accordance with my invention. Fig. 3 is a detail view of the doors to be provided on the vehicles.

According to the said invention the roof $a$ of the vehicle A is adapted to extend forward over the forward portion of the vehicle, a roof-section $b$ being adapted to slide on rollers $c$, carried in a flanged recess $d$ on the sides of the vehicle and provided with stops $e$ to prevent excessive forward movement. A handle $f$ is attached to the said part $b$ for drawing the same forward. For supporting this portion of the roof when drawn forward upright and preferably foldable posts $g$, situated on either side of the driver's seat $h$, may be provided. The space between these posts may be filled in with a window, if desired, in order to still further protect the occupants of the vehicle. When roof-section $b$ is forward, a very materially-increased space for luggage is provided, as well as increased shelter for the occupants of the vehicle. The posts $g$ are made foldable in any suitable manner, which will be readily understood without particular description, as by hinges at suitable points, (indicated by $g'$.)

The doors $k$ may be constructed in vertical panels $k'$, which may be hinged to each other or otherwise secured in such a fashion that each section folds back on the other in the manner of a screen, enabling the door to be opened to its utmost extent, while taking up very little space during the operation of opening and closing.

The roof may be provided with the usual rail for preventing any luggage from falling therefrom.

What I claim, and desire to secure by Letters Patent of the United States, is—

1. The combination, in a wheeled vehicle, of a roofed rear part with rollers mounted above the roof; a slidable outer roof-board mounted on the upper side of said rollers; means for keeping the slidable roof-board on said rollers; and an upright which is forward of said roofed part and which supports the front end of the roof-board when the latter is forward.

2. The combination, in a wheeled vehicle, of a roofed rear part; a slidable roof-board operatively connected with said roofed rear part; and an upright which is forward of said roofed rear part and which supports the end of said roof-board when the latter is forward.

3. The combination, in a wheeled vehicle, of a roofed rear part; a slidable roof-board adapted to carry luggage and operatively connected with said roofed rear part, and means for keeping the slidable roof-board or luggage-carrier in operative relation to said roofed rear part.

In testimony whereof I have hereunto set my hand, in presence of two subscribing witnesses, this 11th day of October, 1904.

SAMUEL GROVES WHITEHOUSE.

Witnesses:
SIDNEY ARTHUR STANLEY,
REGINALD SMITH.